(12) United States Patent
Dalrymple et al.

(10) Patent No.: US 7,545,541 B2
(45) Date of Patent: Jun. 9, 2009

(54) SYSTEMS AND METHODS FOR EMBEDDING METADATA IN A COLOR MEASUREMENT TARGET

(75) Inventors: John Charles Dalrymple, Portland, OR (US); James Zhixin Chang, Vancouver, WA (US)

(73) Assignee: Sharp Laboratories of America, Inc., Camus, WA (US)

( * ) Notice: Subject to any disclaimer, the term of this patent is extended or adjusted under 35 U.S.C. 154(b) by 747 days.

(21) Appl. No.: 11/134,798

(22) Filed: May 20, 2005

(65) Prior Publication Data

US 2006/0262360 A1    Nov. 23, 2006

(51) Int. Cl.
*H04N 1/40* (2006.01)
(52) U.S. Cl. .................. 358/3.28; 283/113; 380/54; 380/55; 382/100
(58) Field of Classification Search ............... 358/3.28, 358/518, 504; 347/43
See application file for complete search history.

(56) References Cited

U.S. PATENT DOCUMENTS

| | | | |
|---|---|---|---|
| 4,583,186 A | 4/1986 | Davis et al. ............... 364/526 |
| RE33,244 E | 6/1990 | Davis et al. ............... 364/526 |
| 5,901,245 A | 5/1999 | Warnick et al. ............ 382/190 |
| 5,999,703 A | 12/1999 | Schwartz et al. ........... 395/109 |
| 6,048,117 A * | 4/2000 | Banton .................. 400/120.09 |
| 6,239,818 B1 * | 5/2001 | Yoda .......................... 347/43 |
| 6,247,646 B1 | 6/2001 | Iwaguchi et al. ....... 235/462.04 |
| 6,262,804 B1 | 7/2001 | Friend et al. ................ 356/402 |
| 6,327,047 B1 * | 12/2001 | Motamed .................. 358/1.15 |
| 6,507,824 B1 | 1/2003 | Yon et al. ..................... 705/26 |
| 6,525,819 B1 | 2/2003 | Delawter et al. ............ 356/406 |
| 6,752,082 B2 | 6/2004 | Derhak et al. ............... 101/484 |
| 6,825,919 B2 | 11/2004 | Beimers et al. ............... 356/72 |
| 6,845,712 B2 | 1/2005 | Leonhardt et al. ......... 101/463.1 |
| 7,212,312 B2 * | 5/2007 | Motamed ..................... 358/1.9 |
| 7,394,567 B2 * | 7/2008 | Chen ........................... 358/1.9 |
| 7,436,549 B2 * | 10/2008 | Venable et al. ............... 358/1.9 |
| 2003/0098986 A1 | 5/2003 | Pop ............................. 358/1.9 |
| 2003/0125892 A1 | 7/2003 | Edge .......................... 702/107 |
| 2003/0177930 A1 | 9/2003 | Derhak et al. ............... 101/484 |
| 2003/0221573 A1 | 12/2003 | Leonhardt et al. ......... 101/463.1 |
| 2004/0004731 A1 | 1/2004 | Itagaki ....................... 358/1.9 |
| 2004/0027537 A1 | 2/2004 | Sarver ........................ 351/212 |
| 2004/0114157 A1 * | 6/2004 | Linder et al. ................. 358/1.9 |
| 2004/0145792 A1 | 7/2004 | Maeyama et al. ........... 359/239 |

(Continued)

FOREIGN PATENT DOCUMENTS

AU    2003219840    9/2003

(Continued)

*Primary Examiner*—Mark K Zimmerman
*Assistant Examiner*—Dung D Tran
(74) *Attorney, Agent, or Firm*—Kirton & McConkie; Michael F. Krieger (57) ABSTRACT

Systems and methods for utilizing metadata embedded in a color measurement target to uniquely identify the target through color measurement. A color measurement target is used for color calibration, color characterization, color adjustment and/or color correction of a color output device and includes a collection of color patches imaged by the output device, wherein metadata is embedded directly into the color patches of the color measurement target to uniquely identify the target through color measurement. The metadata-bearing patches in the target are used to communicate information through color measurement, and can contribute to the color characterization.

20 Claims, 3 Drawing Sheets

U.S. PATENT DOCUMENTS

| | | |
|---|---|---|
| 2004/0165024 A1 | 8/2004 | Vilanova et al. ............... 347/19 |
| 2004/0165769 A1 | 8/2004 | Huh et al. ................... 382/162 |
| 2004/0218233 A1 | 11/2004 | Edge .......................... 358/504 |
| 2004/0264768 A1 | 12/2004 | Sharma et al. ............... 382/165 |
| 2004/0264769 A1 | 12/2004 | Sharma et al. ............... 382/165 |
| 2004/0264770 A1 | 12/2004 | Sharma et al. ............... 382/165 |
| 2004/0264771 A1 | 12/2004 | Sharma et al. ............... 382/165 |
| 2006/0152776 A1* | 7/2006 | Bailey ........................ 358/504 |

FOREIGN PATENT DOCUMENTS

| | | |
|---|---|---|
| EP | 1435560 | 7/2004 |
| JP | 2001358955 | 12/2001 |
| JP | 2003169223 | 6/2003 |
| JP | 2003271116 | 9/2003 |
| JP | 2004037525 | 2/2004 |
| JP | 2004112270 | 4/2004 |
| JP | 2004269745 | 9/2004 |
| WO | WO0044569 | 8/2000 |
| WO | WO0157484 | 8/2001 |

\* cited by examiner

SYSTEMS AND METHODS FOR EMBEDDING METADATA IN A COLOR MEASUREMENT TARGET

BACKGROUND OF THE INVENTION

1. Field of the Invention

The present invention relates to color measurement, calibration, characterization, rendering and/or replication. In particular, the present invention relates to systems and methods for utilizing metadata embedded in a color measurement target to uniquely identify the target through color measurement.

2. Background and Related Art

A color measurement target that is used for color calibration or characterization of a color output device (e.g., a printer, copier, or multi-function device) contains a collection of color patches imaged by the output device on physical media (e.g., paper or transparency material). The color patches are typically measured using a colorimeter or spectrophotometer, and the measurements are processed by software programs to generate color calibration, characterization, and/or rendering data structures, such as ICC profiles, for the output device.

The software that processes the measurements requires knowledge of certain conditions or parameters that are used in construction of the measured target. Currently available techniques include those that utilize a separate file or bar code to communicate such conditions or parameters through a separate data path.

In one technique, the workflow steps of target generation, printing, color measurement, and measurement data processing are all performed by separate software applications. Multiple image files (one per page) are created to be printed and measured, and corresponding conditions or parameters are stored in a separate file that is later read by a measurement processing application. The measurement system only measures a page at a time, yielding a separate data file for each page, and the measurement processing software requires that the correct measurement data file be associated with the correct condition/parameter file for each target page. The associations between the data file and the condition/parameter file are performed manually via a user interface, which has proven to be tedious and error prone.

In another technique, a bar code is used to communicate the conditions or parameters through a separate data path. However, such techniques require the use of a bar code reading device that is separate from the color measurement device for scanning the bar code.

Thus, while techniques currently exist that are used in association with color measurement targets, challenges still exist. Accordingly, it would be an improvement in the art to augment or even replace current techniques with other techniques.

SUMMARY OF THE INVENTION

The present invention relates to color measurement, calibration, characterization, rendering and/or replication. In particular, the present invention relates to systems and methods for utilizing metadata embedded in a color measurement target to uniquely identify the target through color measurement.

Implementation of the present invention takes place in association with a color measurement target that is used for color calibration or characterization of a color output device and includes a collection of color patches imaged by the output device. The color patches are measured, for example, using a calorimeter or spectrophotometer, and the measurements are processed by a software application to generate color calibration, characterization, and/or rendering data structure(s), such as ICC profiles, for the output device.

The software application that processes the measurements utilizes certain conditions or parameters used in construction of the measured target. In accordance with implementations of the present invention, such conditions or parameters are embedded as metadata directly into the color patches of the color measurement target to uniquely identify the target through color measurement. In particular, target creation software encodes the metadata in the specific colorant mixtures and/or in the locations or positional arrangements thereof that are imaged in a subset of the color patches on one or more pages of the measurement target. In addition to the metadata-bearing patches in the target being used to communicate such conditions/parameters, the metadata-bearing patches additionally contribute to the color characterization.

Examples of such embedded metadata in the characterization of an output device include (i) information relating to colorant mixtures (e.g. CMYK amounts for a four-color device) of a target patch, (ii) any total colorant limitation imposed upon the printed colorant mixtures, (iii) information relating to a colorant limitation process used, such as when multiple processes are available, (iv) a page number for each page, such as when the target includes multiple pages, (v) a numerical signature that identifies the device being characterized, and/or (vi) a numerical signature that identifies the media being characterized.

Accordingly, a color measurement device directly reads the metadata-bearing patches, and eliminates the need for use of another reading device, separate path and/or manual synchronization. Pages are allowed to be measured in any order. The color-measuring device and its controlling software are unaware of the presence of the metadata, as the metadata is merely passed through. A measurement-processing software module detects the metadata-bearing patches and extracts the metadata from the measurements of the metadata-bearing patches.

While the methods and processes of the present invention have proven to be particularly useful in association with a color measurement target for color calibration or characterization of a color printer, those skilled in the art can appreciate that the methods and processes can be used in association with a variety of different color applications and/or color output devices, including color monitors, screens, plotters, copiers, facsimile devices, multi-function devices, and other color output devices.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the above recited and other features and advantages of the present invention may be obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to color measurement, calibration, characterization, rendering and/or replication. In particular, the present invention relates to systems and methods for utilizing metadata embedded in a color measurement target to uniquely identify the target through color measurement.

Embodiments of the present invention take place in association with a color measurement target that is used for color calibration or characterization of a color output device (e.g., a monitor, screen, plotter, printer, copier, multi-function device, or other color output device) and includes a collection of color patches imaged by the output device. The color patches are measured, for example, using a colorimeter or spectrophotometer, and the measurements are processed by a software application to generate color calibration, characterization, and/or rendering data structure(s), such as ICC profiles, for the output device.

The software application that processes the measurements utilizes certain conditions or parameters used in construction of the measured target. In accordance with embodiments of the present invention, such conditions or parameters are embedded as metadata directly into the color patches of the color measurement target to uniquely identify the target through color measurement. In at least some embodiments, target creation software encodes the metadata in the specific colorant mixtures and/or in the locations or positional arrangements thereof that are imaged in a subset of the color patches of the measurement target. In addition to the metadata-bearing patches in the target being used to communicate such conditions/parameters, the metadata-bearing patches additionally contribute to the color characterization. The color-measuring device and its controlling software are unaware of the presence of the metadata, as the metadata is merely passed through. A measurement-processing software module detects the metadata-bearing patches and extracts the metadata from the measurements of the metadata-bearing patches.

The following disclosure of the present invention is grouped into two subheadings, namely "Exemplary Operating Environment" and "Embedding Metadata in a Color Measuring Target." The utilization of the subheadings is for convenience of the reader only and is not to be construed as limiting in any sense.

Exemplary Operating Environment

Figure 1:
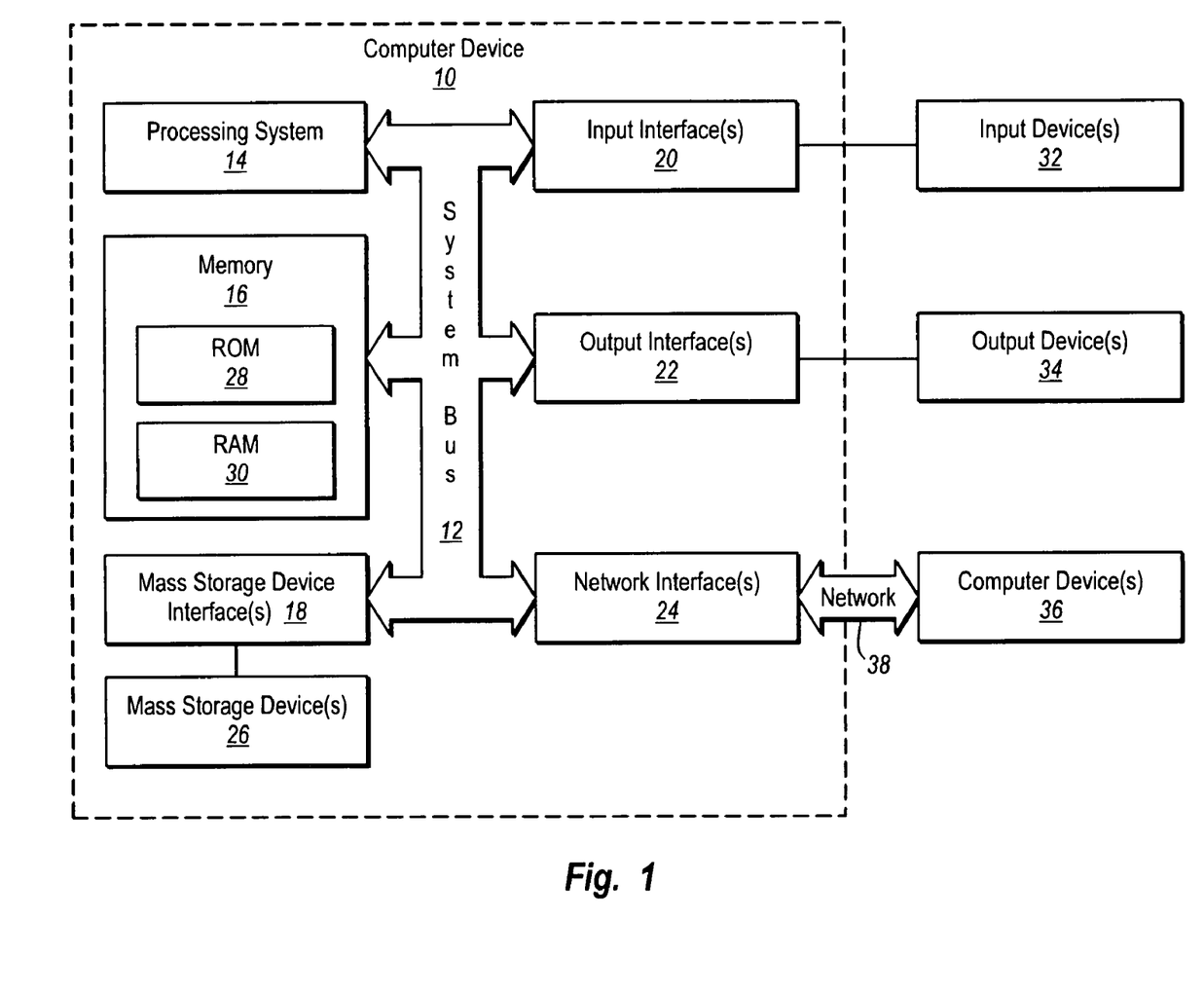
FIG. 1 illustrates a representative system that provides a suitable operating environment for use of the present invention.

Inasmuch as at least some embodiments of the present invention embrace utilization of a computer device, FIG. 1 and the corresponding discussion are intended to provide a general description of a suitable operating environment in which the invention may be implemented. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 1, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), IEEE 1394, or another interface.

One or more output interfaces 22 may be employed to connect one or more corresponding output devices 34, such as color output devices, to system bus 12. Examples of output devices include a color monitor or display screen, a printer, a plotter, a multi-function device, or other color output device. A particular output device 34 may be integrated with or peripheral to computer device 10. Examples of output interfaces include a video adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
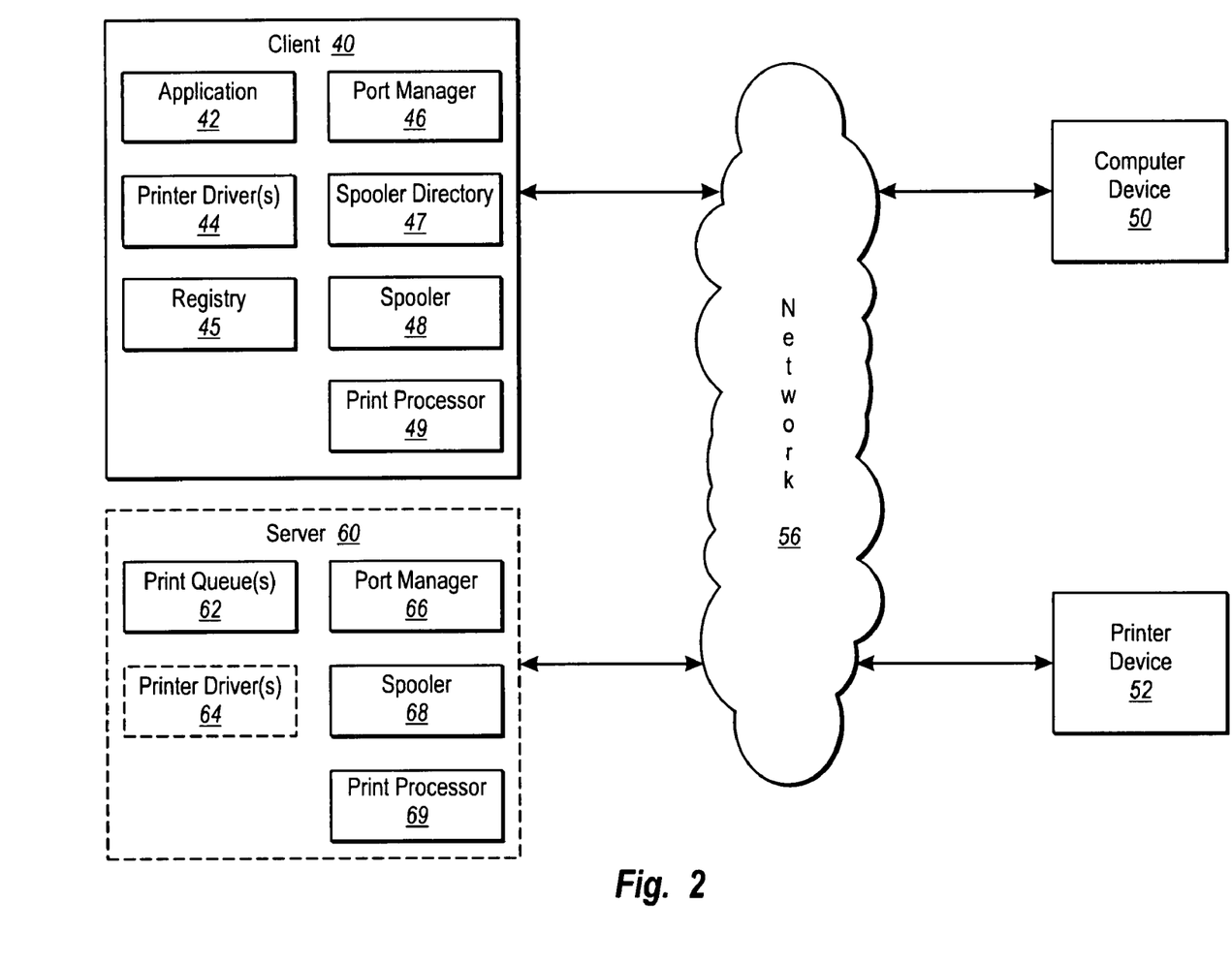
FIG. 2 illustrates a representative system configuration in association with an embodiment of the present invention.

While those skilled in the art will appreciate that embodiments of the present invention may be practiced in a variety of different environments with many types of computer system configurations, FIG. 2 represents a representative networked system configuration that may be used in association with an embodiment of the present invention. While FIG. 2 illustrates an embodiment that includes a client, a computer device, a printer device, and optionally a print server connected to a network, alternative embodiments include more than one client, a plurality of printer devices, no server, and/or more than one server connected to a network. Other embodiments of the present invention include local, networked, or peer-peer printing environments where one or more computer devices are locally connected to a one or more printing devices. Moreover, embodiments in accordance with the present invention also include wireless networked environments, or where the network is a wide area network, such as the Internet.

The representative system of FIG. 2 includes a computer device, illustrated as client 40, which is connected to another computer device 50 and to a printing device 52 across network 56. While printer 52 is connected to network 56, embodiments of the present invention embrace the use of printing devices or other color output devices that are locally connected to a computer device, that are configured in a peer-to-peer printing environment, or that are configured in a wireless network environment. Further, a printing device may be a multi-function printer (MFP), or facsimile device.

In the illustrated embodiment, client 40 includes a software application 42, one or more print drivers 44, a registry 45, a port manager 46, a spool directory 47, a spooler 48, and a print processor 49. A printer server 60 is optionally included having, for example, one or more print queues 62, one or more printer drivers 64, a port manager 66, a spooler 68, and a print processor 69.

Thus, in accordance with the illustrated embodiment and other embodiments of the present invention, a color rendering environment is provided for utilizing metadata embedded in a color measurement target to uniquely identify the target through color measurement, as will be further explained below.

Embedding Metadata in a Color Measuring Target

As provided herein, embodiments of the present invention relate to systems and methods for utilizing metadata embedded in a color measurement target to uniquely identify the target through color measurement. A color measurement target is used for color calibration or characterization of a color output device. Each page of a color measurement target includes a collection of patches arranged in an orderly way (e.g., on a rectangular grid). The colorant mixtures of the patches sample the signal space (e.g., CMYK) of the device. In order to compensate for spatial variability in the color produced by the output device, target creation software distributes CMYK combinations to the grid sites in a pre-determined, scrambled or shuffled manner that may include a different order on each page.

According to embodiments of the present invention, a subset of patch locations of the target is designated as the "metadata bearing patches." In at least some embodiments, colorant mixtures placed at these locations are drawn from a small, predetermined set of easily detectable colors. A target generation application uses an encoding process to map each unique metadata value to a corresponding unique arrangement of colors. Different patch locations, color sets, and encoding rules selectively communicate different information. Any remaining, non-metadata bearing, patch locations of the target are populated in a scrambled or shuffled manner.

In accordance with embodiments of the present invention, a target is generated that includes some number of image files that include colored patches having metadata selectively embedded therein. The color patches of the target are printed and measured. The color output device is then able to be modeled using the metadata embedded in the colored patches, and tables in a standardized or pre-determined format (e.g., an ICC profile) are created.

The metadata-bearing patches in the target are used to encode and communicate information, such as conditions/ parameters, and also contribute to the color characterization. Examples of such embedded metadata in the characterization of an output device include (i) information relating to colorant mixtures (e.g. CMYK amounts for a four-color device) of a target patch, (ii) any total colorant limitation imposed upon the printed colorant mixtures, (iii) information relating to a colorant limitation process used, such as when multiple processes are available, (iv) a page number for each page, such as when the target includes multiple pages, (v) a numerical signature that identifies the device being characterized, and/ or (vi) a numerical signature that identifies the media being characterized.

Embodiments of the present invention enable creation and use of the forward and reverse tables. In particular, embodiments of the present invention allow for the creation and use of a table that indicates that given a particular CMYK, a particular LAB will result. Additionally, embodiments of the present invention allow for the creation and use of a table that indicates that given a particular LAB, a particular CMYK should be sent.

Figure 3:
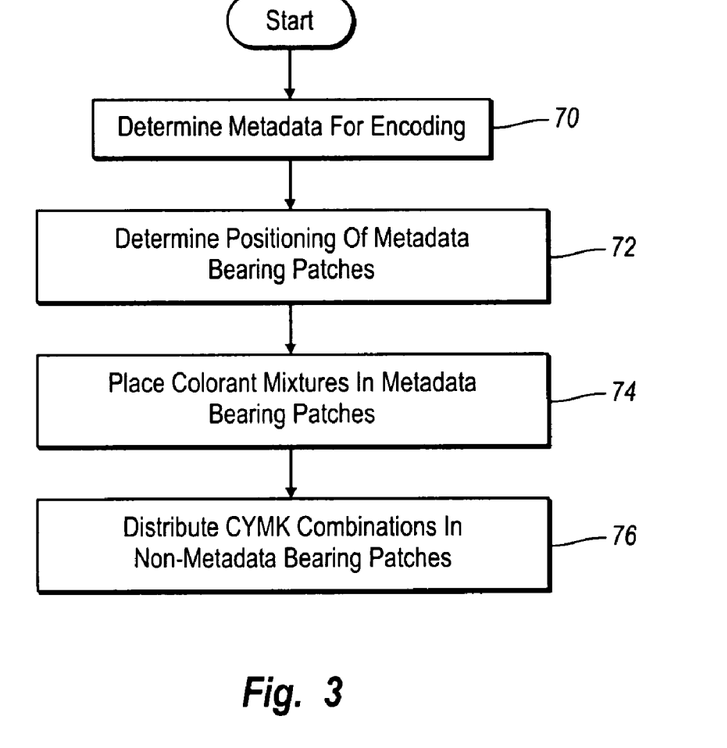
FIG. 3 illustrates representative target generation processing in association with an embodiment of the present invention for embedding metadata in a color measurement target to uniquely identify the target through color measurement.

In at least some embodiments, a stand-alone application generates image files for the color measurement target. With reference to FIG. 3, representative target generation processing in association with a representative embodiment of the present invention is illustrated for embedding metadata in a color measurement target to uniquely identify the target through color measurement.

In FIG. 3, execution begins at step 70, where metadata values are determined for encoding. By way of example, the following provides a representative color set for metadata encoding, wherein "1" represents 100% coverage:

CMYK=(0, 0, 0, 0) (white)
CMYK=(0, 0, 1, 0) (yellow)
CMYK=(0, 1, 0, 0) (magenta)
CMYK=(0, 1, 1, 0) (red)
CMYK=(1, 0, 0, 0) (cyan)
CMYK=(1, 0, 1, 0) (green)
CMYK=(1, 1, 0, 0) (blue)
CMYK=(0, 0, 0, 1) (black)

The above eight colors are widely separated in a color space, facilitating reliable detection. At step 72, the positioning of metadata bearing patches is determined. In some embodiments, the metadata bearing patches are fixed patch locations. In other embodiments, the metadata bearing patch locations are shuffled. A target is provided or otherwise created having a collection of color patches for measurement, wherein the color patches include metadata bearing patches and non-metadata bearing patches. At step 74, the colorant mixtures from the metadata encoding color set are placed in the metadata bearing patches. At step 76, CMYK combinations are distributed in non-metadata bearing patches.

A color measurement device directly reads the metadata-bearing patches, and eliminates the need for use of another reading device, separate path and/or manual synchronization. The color-measuring device and its controlling software are unaware of the presence of the metadata, as the metadata is passed through. A measurement-processing software module detects the metadata-bearing patches and extracts the metadata from the measurements of the metadata-bearing patches.

Figure 4:
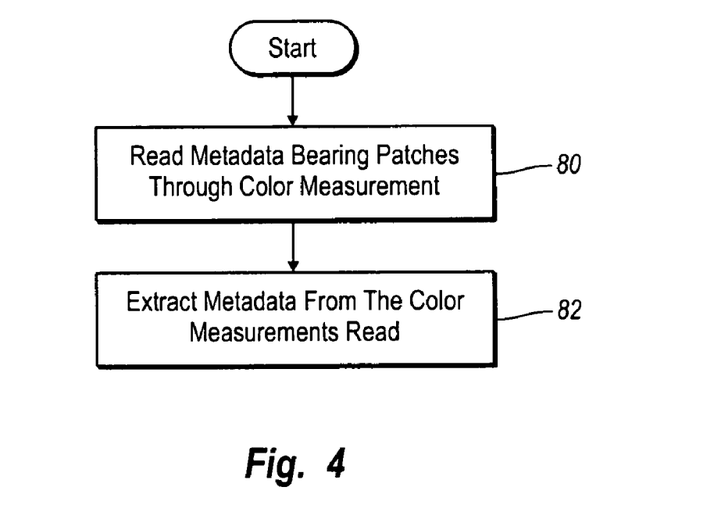
FIG. 4 illustrates representative profile making processing in association with an embodiment of the present invention that includes reading such embedded metadata through color measurement.

With reference to FIG. 4, representative profile making processing in association with an embodiment of the present invention is illustrated that includes reading such embedded metadata through color measurement. In FIG. 4, execution begins at step 80, wherein the metadata bearing patches are read through color measurement. At step 82, the metadata is extracted from the color measurements read by the color measurement application. Thus, a measurement application, which only knows how to measure color, is used to measure the color corresponding to the embedded metadata in order to create an ICC profile that is used in another work flow to match, replicate or render the color. The profile is created for use in identifying that given a particular CMYK, a particular LAB will result, or that given a particular LAB, a particular CMYK should be sent.

In at least some embodiments, the target generation portion and the profile making portion are separate applications. The color measurements are made by a separate application that knows nothing of the embedded metadata. Information is added regarding the arrangement of the patches on a particular page and rules are established such that a profile making portion will know the rules and can look at the measurement data and determine the message that was embedded in the color patches.

Thus, the metadata communicates information relating to non-metadata bearing patches. For example, the rules that are used to color the metadata bearing patches imply the ordering of each non-metadata bearing patch.

The non-metadata bearing color patches of the target are shuffled in a particular manner described by the message that is passed through the measurement application, which just measures the color patches. The profile generation application understands the rules used to shuffle the patches and therefore can determine by reading the color measurement of the metadata bearing patches the message that was sent through the target and any corresponding functionality.

In one embodiment, the color measurement application reads all of the color patches arranged in a rectangular grid (or other configuration) in a raster-scan order, and provides a list of color measurements. The target generation portion and the profile making portion understand the particular order used and know which patches include metadata.

In one embodiment, a subset of the color patches is reserved to include extra information, such as a seed or an initial state for a pseudo-random number generator that is used to shuffle the non-metadata bearing patches. That seed is then read through color measurement and identified to communicate how to decode the shuffled patches since a similar random number generator is used, starting with the identified seed. The seed is encoded in the metadata bearing patches.

In a further embodiment, the first pre-determined number of patches (e.g., first six or other number of patches) include the embedded metadata. In one embodiment the six patches are, in order, red, green blue cyan, yellow and magenta—at 100%. The embedded metadata can be used as a number having individual bytes to communicate the needed information, but is being read through color measurement.

Thus, rules are established for generating targets. The target generating portion and the profile creating portion understand and agree on the established rules. Information is provided as metadata, such as a particular target type or number (e.g., page number, pseudo-random number generator seed, etc.). The embedded target type communicates the arrangement of non-metadata bearing patches. Accordingly, it is determined/known, without sending extra files, what CMYK is printed for each of the non-metadata bearing patches on each of the pages of the target.

In one embodiment, a fixed set of patch locations is reserved and metadata is encoded as the colors of these patches. Since the present example includes an encoding color set that has 8 states, a patch at a fixed location carries log2(8) or 3 bits of metadata. 3N bits of metadata can thus be carried using N patch locations. However, it is not guaranteed that all colors of the encoding set will be present in the encoding of any particular metadata value. For example, if a white patch is used to signify a group of metadata bits equal to 000, and five patches are reserved to carry 15 bits of metadata, then the metadata value 000000000000000 will be encoded as five white patches. In this case, the five white "metadata measurements" can be averaged with those of the other white patches of the target. To increase color-detection reliability within the measurement processing software, the target can include (in addition to the metadata-bearing patches themselves) all colors of the encoding set at fixed known locations. Measurements of these "reference patches" can be used to detect the colors of the metadata-bearing patches. Detection can be based, for example, on an Euclidean distance from the reference measurements in a uniform color space. In the present 8-color encoding set example, 8+N patches encode 3N bits of metadata, and 13 patches can be used to encode 15 bits of metadata. If no reference patches are used, a sophisticated color detection process can be used to detect the presence of white, black, red, green, blue, cyan, magenta, and yellow patches.

In another embodiment, the metadata is encoded as permutations of color patches within a fixed, predetermined set of patch locations. Thus, for an 8-color set, there are 8 metadata-bearing patches. All colors of the encoding set are always present, and the scheme can encode 8! states, or log2(8!)= 15.3 bits of metadata. All 8 encoding colors are present, and they can all contribute to the actual color measurement. The measurements are analyzed to determine which color of the encoding set is present at each metadata-bearing patch location. The target generation module uses the methods of permutation steganography to encode metadata values into patch permutations, and the measurement data processing module uses the methods to decode metadata values from detected patch permutations. Optionally, all encoding colors are provided as reference patches at fixed locations on the target, and the measurements of these reference patches facilitate the identification of the colors of the metadata-bearing patches. If this is done with an 8-color encoding set, 16 patches encode about 15.3 bits of metadata.

In another embodiment, the metadata is encoded in the locations of the color patches on the target. The number of times the patches appear on the target is fixed. For example, if a target has 5 reliably detectable color patches that appear in the data only once, and if this target has a total of 875 patches, then the different ways in which these 5 color patches are distributed within the 875 locations will give log2(875!/870!)= 48.8 bits of metadata. The measurement processing software distinguishes the metadata-bearing patches from all other target patches. Reference patches at fixed locations significantly increase the reliability of detecting the metadata-bearing patches. If 5 fixed locations are reserved for reference patches, the usable number of target patch locations is reduced to 870, and the metadata carrying capacity is reduced to log2(870!/865!), which is still roughly 48.8 bits.

Those skilled in the art will appreciate that the embodiments discussed above are representative in nature, and that the various encoding schemes discussed herein can be combined with one another to create more sophisticated schemes.

Thus, as discussed herein, the embodiments of the present invention embrace color measurement, calibration, characterization, rendering and replication. In particular, the present invention relates to systems and methods for utilizing metadata embedded in a color measurement target to uniquely identify the target through color measurement.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for utilizing metadata in a color measurement target to uniquely identify the target, the method comprising:
    encoding metadata for inclusion in one or more color patches of a color measurement target;
    rendering the color measurement target having a plurality of color patches, wherein said one or more color patches of said plurality of color patches includes said metadata embedded therein; and
    reading from the rendered color measurement target said metadata embedded in said one or more color patches to uniquely identify the color measurement target.

2. A method as recited in claim 1, wherein said reading from the rendered color measurement target said metadata embedded in said one or more color patches comprises using a color measurement mechanism to measure color of said one or more color patches.

3. A method as recited in claim 2, wherein said reading from the rendered color measurement target said metadata embedded in said one or more color patches further comprises:
    detecting said one or more color patches from the color measurements; and
    extracting said metadata from the color measurements.

4. A method as recited in claim 3, wherein the color measurement mechanism is one of:
    (i) a colorimeter; and
    (ii) a spectrophotometer.

5. A method as recited in claim 1 wherein said metadata comprises information regarding ordering of color patches not including metadata embedded therein, said information comprising a seed for a pseudo-random generator used to shuffle said color patches not including metadata embedded therein.

6. A method as recited in claim 1, wherein said one or more color patches including metadata therein comprises a fixed set of patch locations reserved for metadata bearing patches.

7. A method as recited in claim 6, wherein rendering said color measurement target comprises rendering a set of reference color patches in said color measurement target.

8. A method as recited in claim 1, wherein said metadata includes information relating to construction of said color measurement target.

9. A method as recited in claim 8, wherein said metadata contributes to color characterization of the color measurement target.

10. A method as recited in claim 1, wherein said encoding metadata for inclusion in one or more color patches of a color measurement target comprises encoding metadata as permutations of color patches within a pre-determined set of patch locations.

11. A method as recited in claim 1, wherein said encoding metadata for inclusion in one or more color patches of a color measurement target comprises encoding metadata in one or more locations of the color patches.

12. A method as recited in claim 1, wherein said metadata is embedded in at least one of:
    (i) specific colorant mixtures; and
    (ii) particular positional arrangements.

13. A method as recited in claim 1, wherein said metadata includes information relating to at least one of:
    (i) colorant mixtures of a target patch;
    (ii) a total colorant limitation amount imposed upon a rendered colorant mixture;
    (iii) a particular colorant limitation process used in rendering the color measurement target;
    (iv) a page number of the color measurement target;
    (v) a numerical signature that identifies a color rendering device being characterized; and
    (vi) a numerical signature that identifies a medium upon which the color measurement target is rendered.

14. A method for utilizing metadata in a color measurement target to uniquely identify the target, the method comprising:
    designating one or more color patch locations of a color measurement target having a plurality of color patches as metadata bearing patches;
    drawing from a pre-determined set of detectable colors for colorant mixtures placed at said color patch locations;
    mapping one or more metadata values to a corresponding arrangement of at least one of said detectable colors;

rendering the color measurement target, wherein said plurality of color patches includes said metadata embedded as colorant mixtures at said metadata bearing patches; and reading from the rendered color measurement target said metadata embedded as colorant mixtures at said metadata bearing patches to uniquely identify the color measurement target.

15. A method as recited in claim 14, wherein said reading from the rendered color measurement target said metadata embedded as colorant mixtures at said metadata bearing patches comprises:

using a color measurement mechanism to measure color of said plurality of color patches;

detecting said metadata bearing patches from the color measurements; and extracting one or more of the metadata values from the color measurements.

16. A method as recited in claim 14, further comprising:

using the embedded metadata to generate data structures for the output device, and wherein said metadata bearing patches contribute to at least one of (i) color calibration, (ii) color characterization, (iii) color adjustment, and (iv) color correction of the color measurement target.

17. A method as recited in claim 16, wherein said embedded metadata includes information relating to construction of said color measurement target.

18. A method as recited in claim 14, further comprising encoding said metadata in said metadata bearing patches as permutations of color patches within a pre-determined set of patch locations.

19. A method as recited in claim 14, wherein said metadata is embedded in said metadata bearing color patches in at least one of:

(i) specific colorant mixtures; and
(ii) particular positional arrangements.

20. A method as recited in claim 14, wherein said metadata includes information relating to at least one of:

(i) colorant mixtures of a target patch;
(ii) a total colorant limitation amount imposed upon a rendered colorant mixture;
(iii) a particular colorant limitation process used in rendering the color measurement target;
(iv) a page number of the color measurement target;
(v) a numerical signature that identifies a color rendering device being characterized; and
(vi) a numerical signature that identifies a medium upon which the color measurement target is rendered.

* * * * *